(12) United States Patent
Lee et al.

(10) Patent No.: US 12,465,089 B2
(45) Date of Patent: Nov. 11, 2025

(54) ELECTRONIC DEVICE FOR OUTPUTTING IMAGE DATA AND OPERATING METHOD THEREOF

(71) Applicant: KT&G CORPORATION, Daejeon (KR)

(72) Inventors: Won Kyeong Lee, Guri-si (KR); Soung Ho Ju, Daegu (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/912,732

(22) PCT Filed: Aug. 8, 2022

(86) PCT No.: PCT/KR2022/011787
§ 371 (c)(1),
(2) Date: Sep. 19, 2022

(87) PCT Pub. No.: WO2023/033389
PCT Pub. Date: Mar. 9, 2023

(65) Prior Publication Data
US 2024/0206551 A1  Jun. 27, 2024

(30) Foreign Application Priority Data

Sep. 6, 2021  (KR) .......................... 10-2021-0118546

(51) Int. Cl.
*A24F 40/50* (2020.01)
*A24F 40/60* (2020.01)
(Continued)

(52) U.S. Cl.
CPC .............. *A24F 40/50* (2020.01); *A24F 40/60* (2020.01); *A24F 40/65* (2020.01); *G02B 27/017* (2013.01);
(Continued)

(58) Field of Classification Search
CPC ...... A24F 40/00; A24F 40/50; A24F 40/5153; A24F 40/60; A24F 40/65; A24F 42/00;
(Continued)

(56) References Cited

U.S. PATENT DOCUMENTS

2007/0006889 A1*  1/2007  Kobal ..................... A24F 42/20
                                                                131/329
2015/0156196 A1   6/2015  Kim et al.
(Continued)

FOREIGN PATENT DOCUMENTS

CN   108472462 A   8/2018
JP   2019-508026 A   3/2019
(Continued)

OTHER PUBLICATIONS

Lee, English translation for KR-101119398-B1 (Year: 2010).*
(Continued)

*Primary Examiner* — Jonathan Y Jung
(74) *Attorney, Agent, or Firm* — Sughrue Mion, PLLC

(57) ABSTRACT

An electronic device wearable by a user includes a communication module that performs communication with an external device, a display, and a processor electrically connected to the communication module and the display, wherein the processor may receive data on a smoking event from the external device through the communication module, and based on the received data on the smoking event, output image data including at least one object corresponding to the smoking event, through the display. In addition, various embodiments identified through the specification are possible.

15 Claims, 13 Drawing Sheets

(51) Int. Cl.
*A24F 40/65* (2020.01)
*G02B 27/01* (2006.01)

(52) U.S. Cl.
CPC .............. *G02B 2027/0138* (2013.01); *G02B 2027/014* (2013.01)

(58) Field of Classification Search
CPC ... A24F 47/00; A24F 2700/00; G02B 27/017; G02B 2027/014; G02B 2027/0141; G02B 27/0172; H04N 21/42201
See application file for complete search history.

(56) References Cited

U.S. PATENT DOCUMENTS

| 2019/0000147 | A1* | 1/2019 | Koc | A24F 40/65 |
| 2019/0107724 | A1 | 4/2019 | Ikeda | |
| 2020/0093177 | A1* | 3/2020 | Han | A24F 40/50 |
| 2020/0154773 | A1* | 5/2020 | Lim | A24F 40/53 |
| 2021/0106051 | A1 | 4/2021 | Han et al. | |
| 2021/0259557 | A1 | 8/2021 | Frank et al. | |

FOREIGN PATENT DOCUMENTS

| JP | 2020-518235 | A | 6/2020 | |
| KR | 10-2010-0115679 | A | 10/2010 | |
| KR | 101119398 | B1* | 3/2012 | ............ A61M 15/06 |
| KR | 10-2014-0017734 | A | 2/2014 | |
| KR | 10-2014-0134945 | A | 11/2014 | |
| KR | 10-1523088 | B1 | 5/2015 | |
| KR | 10-2017-0004479 | A | 1/2017 | |
| WO | 2020/128431 | A1 | 6/2020 | |
| WO | 2021/071208 | A1 | 4/2021 | |

OTHER PUBLICATIONS

Communication issued Oct. 7, 2024 in Russian Application No. 2022127770/28.
Japanese Office Action issued Dec. 5, 2023 in Application No. 2022-561681.
Extended European Search Report issued Jan. 16, 2023 in European Application No. 22765384.7.
International Search Report issued Dec. 8, 2022 in International Application No. PCT/KR2022/011787.
Written Opinion issued Dec. 8, 2022 in International Application No. PCT/KR2022/011787.
Communication dated Jun. 5, 2025 in Chinese Application No. 202280006195.3.

* cited by examiner

ELECTRONIC DEVICE FOR OUTPUTTING IMAGE DATA AND OPERATING METHOD THEREOF

This Application is a National Stage of International Application No. PCT/KR2022/011787 filed Aug. 8, 2022, claiming priority based on Korean Patent Application No. 10-2021-0118546 filed Sep. 6, 2021.

TECHNICAL FIELD

The disclosure relates to an electronic device that outputs image data corresponding to a state of a smokeless inhalation instrument, and an operating method thereof.

BACKGROUND ART

When smoking is performed through general cigarettes, side-stream smoke may be generated in the case of a combustion method, and an aerosol may be generated in the case of a heating method. Recently, there is increasing recognition of the potential risks of smoke generated by cigarette smoking to non-smokers. In this regard, countries are regulating smoking areas so that smoking is allowed only in specific areas.

In order to improve the inconvenience of smokers due to the restriction on areas where smoking is allowed and to prevent potential risks to non-smokers, smokeless tobacco that does not generate smoke has been developed in recent years. Smokeless tobacco may refer to tobacco that generates a tobacco flavor in a non-combustion or non-heating manner. Examples of smokeless tobacco may include chewing tobacco, snus, snuff, and the like.

DISCLOSURE OF INVENTION

Technical Problem

When a smoker who has had smoking experience through general cigarettes inhales nicotine through smokeless tobacco, smoking satisfaction that has been achieved by smoke generated from a cigarette may be reduced. In other words, when smoking is performed through smokeless tobacco, a smoker may not achieve smoking satisfaction in a visual aspect.

Technical problems to be solved by the embodiments of the disclosure are not limited to the above-described problems, and problems that are not mentioned will be clearly understood by those of ordinary skill in the art from the present specification and the accompanying drawings.

Solution to Problem

In an embodiment, an electronic device wearable by a user includes a communication module that performs communication with an external device, a display, and a processor electrically connected to the communication module and the display, wherein the processor may receive data on a smoking event from the external device through the communication module, and output image data including at least one object corresponding to the smoking event, through the display, based on the received data on the smoking event.

In an embodiment, an operating method of an electronic device wearable by a user may include receiving data on a smoking event from an external device through a communication module, and outputting image data including at least one object corresponding to the smoking event, through a display, based on the received data on the smoking event.

Advantageous Effects of Invention

According to various embodiments of the disclosure, a user who smokes can achieve a visual smoking satisfaction through a smokeless inhalation instrument.

However, effects to be achieved by embodiments are not limited to the above-described effect, and effects that are not mentioned will be clearly understood by those of ordinary skill in the art from the present specification and the accompanying drawings.

BEST MODE FOR CARRYING OUT THE INVENTION

With respect to the terms in various embodiments of the disclosure, the general terms which are currently and widely used are selected in consideration of functions of structural elements in the various embodiments. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the disclosure. Therefore, the terms used in the various embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the disclosure will be described more fully with reference to the accompanying drawings, in which embodiments of the disclosure are shown such that those of ordinary skill in the art may easily work the disclosure. However, the disclosure can be embodied in many different forms and should not be construed as being limited to the embodiments set forth herein.

Hereinafter, embodiments of the disclosure will be described in detail with reference to the drawings.

Figure 1:
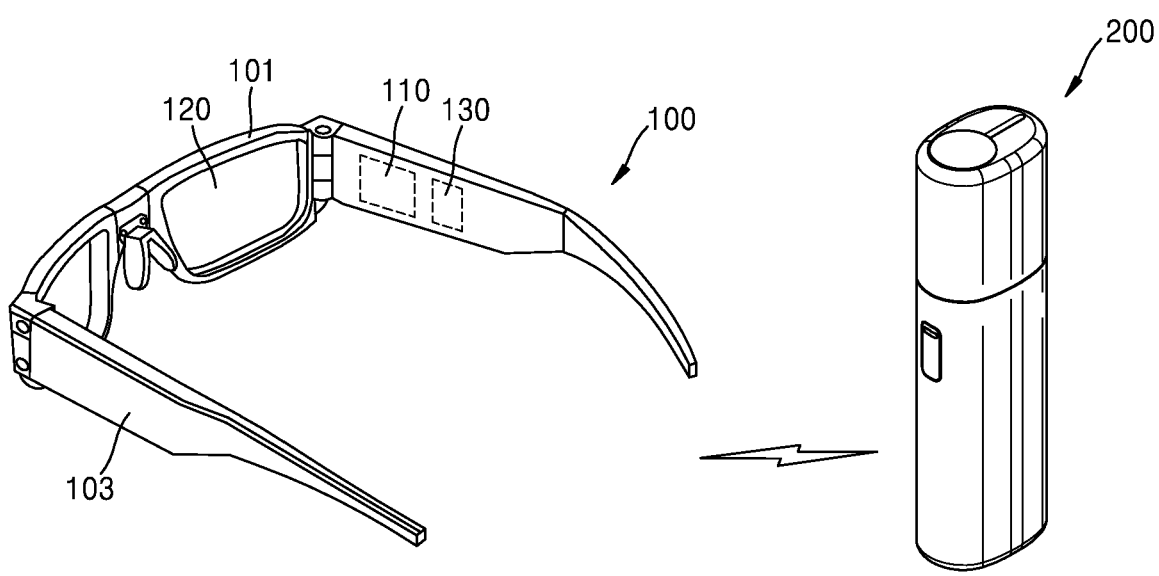
FIG. 1 is a schematic diagram of a smokeless inhalation system according to an embodiment.

FIG. 1 is a schematic diagram of a smokeless inhalation system according to an embodiment.

Referring to FIG. 1, a smokeless inhalation system may include an electronic device 100 and a smokeless inhalation instrument 200. In the disclosure, the electronic device 100 may refer to an electronic device wearable by a user. For example, the electronic device 100 may correspond to a wearable head mounted display (HMD) (for example, augmented reality glasses and virtual reality devices) in the form of glasses or goggles. In the disclosure, the smokeless inhalation instrument 200 may refer to a device that transfers nicotine (or tobacco flavor) to a user but does not generate separate smoke. For example, the smokeless inhalation instrument 200 may have the same appearance as that of aerosol generating devices of the related art. Also, smokeless tobacco of the same form as aerosol generating articles of the related art may be inserted into (or attached/detached to/from) the smokeless inhalation instrument 200. However, the appearance of the smokeless inhalation instrument 200 and the form of the insertable (or attachable/detachable) smokeless tobacco are not limited thereto, and may be changed according to the design by a manufacturer, which may be obvious to those of ordinary skilled in the art.

In an embodiment, the electronic device 100 may include a face plate 101 and a mounting portion 103.

In an embodiment, the face plate 101 of the electronic device 100 may be worn on at least a portion of the front of a user's face. For example, the face plate 101 may include various components (for example, a nose pad) that may be supported by at least portion (for example, a nose bridge) of the front of the user's face.

In an embodiment, the mounting portion 103 of the electronic device 100 may be coupled to a portion of the face plate 101 and supported by a portion (for example, an ear) of a user's body. For example, the mounting portion 103 may include a temple, a strap, or a helmet so that the face plate 101 may be in close contact with an area around the user's eyes.

In an embodiment, the electronic device 100 may include a processor 110, a display 120, and a communication module 130. In an embodiment, the processor 110 and the communication module 130 may be arranged on at least a portion of the mounting portion 103 of the electronic device 100, but the portion where the processor 110 and the communication module 130 are arranged is not limited thereto. In another embodiment, at least one component among the processor 110 and the communication module 130 may also be arranged on a portion excluding the display 120 portion from the face plate 101 of the electronic device 100. In an embodiment, the display 120 may be in the form of a lens of glasses, and thus, may be arranged on the face plate 101 of the electronic device 100.

In an embodiment, communication may be conducted between the electronic device 100 and the smokeless inhalation instrument 200 through a communication interface. For example, the communication module 130 of the electronic device 100 may be connected to a network through wireless communication or wired communication to communicate with the smokeless inhalation instrument 200. The wireless communication may include at least one of wireless fidelity (WI-FI), Bluetooth (BT), near field communication (NFC), or cellular communication (for example, long-term evolution (LTE), LTE-advanced (LTE-A), code-division multiple access (CDMA), wideband code division multiple access (WCDMA), or universal mobile telecommu-nications service (UMTS)). The wired communication may include at least one of universal serial bus (USB) and high definition multimedia interface (HDMI).

In an embodiment, the electronic device 100 may output various image data through the display 120, based on data received from the smokeless inhalation instrument 200 through the communication module 130. Details will be described below.

Figure 2:
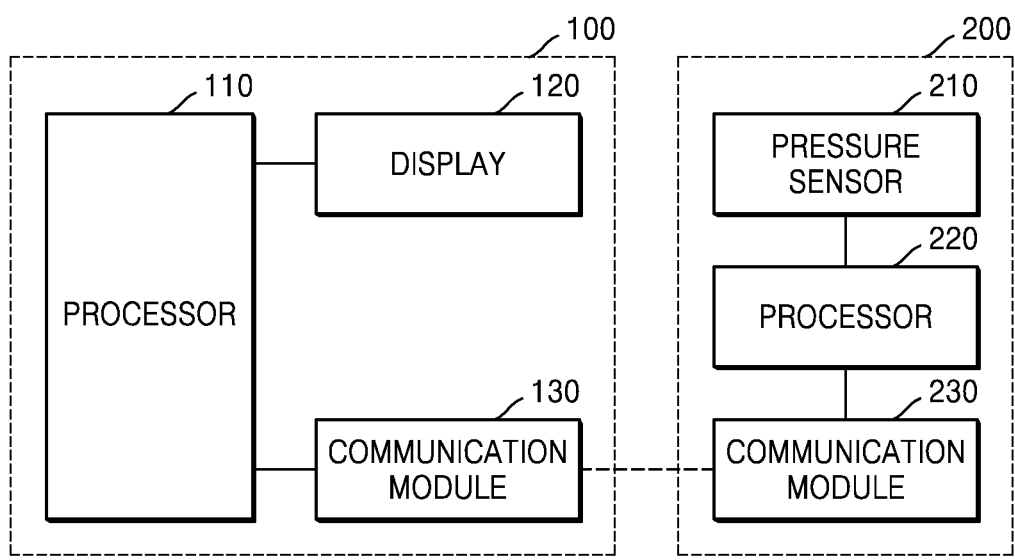
FIG. 2 is a block diagram of an electronic device and a smokeless inhalation instrument, according to an embodiment.

FIG. 2 is a block diagram of an electronic device and a smokeless inhalation instrument, according to an embodiment.

Referring to FIG. 2, the electronic device 100 may include the processor 110, the display 120, and the communication module 130, and the smokeless inhalation instrument 200 may include a pressure sensor 210, a processor 220, and a communication module 230.

In an embodiment, the processor 220 of the smokeless inhalation instrument 200 may detect a smoking event generated by a user. The term "smoking event" in the disclosure may refer to a user's puff event detected by a sensor included in the smokeless inhalation instrument 200. In other words, the processor 220 of the smokeless inhalation instrument 200 may detect the occurrence of a smoking event, in response to detecting a user's inhalation from smokeless tobacco inserted into the smokeless inhalation instrument 200.

In an embodiment, the processor 220 of the smokeless inhalation instrument 200 may detect the occurrence of a smoking event through the pressure sensor 210. For example, when an absolute value of a pressure change (for example, a pressure drop) detected by the pressure sensor 210 is greater than a preset threshold value, the processor 220 may detect the occurrence of a smoking event. In an embodiment, the processor 220 of the smokeless inhalation instrument 200 may transmit, to the electronic device 100, data on a smoking event through the communication module 230.

In an embodiment, the processor 110 of the electronic device 100 may receive data from the smokeless inhalation instrument 200 through the communication module 130. For example, the communication module 130 of the electronic device 100 may receive data on a smoking event from the smokeless inhalation instrument 200 by performing communication connection with the communication module 230 of the smokeless inhalation instrument 200. In an embodiment, when the power of the smokeless inhalation instrument 200 is turned on, the electronic device 100 may automatically establish a communication connection with the communication module 230 of the smokeless inhalation instrument 200 through the communication module 130. For example, when a smoking event is detected by the pressure sensor 210 of the smokeless inhalation instrument 200 after a communication connection is established between the electronic device 100 and the smokeless inhalation instrument 200, the electronic device 100 may receive data on the smoking event from the smokeless inhalation instrument 200 through the communication module 130. As another example, when a smoking event is not detected by the pressure sensor 210 of the smokeless inhalation instrument 200 within a threshold time (for example, 15 seconds) after communication is established between the electronic device 100 and the smokeless inhalation instrument 200, the electronic device 100 may release communication connection with the smokeless inhalation instrument 200.

In an embodiment, the processor 110 of the electronic device 100 may output image data, based on data on a smoking event, the data being received from the smokeless inhalation instrument 200. In this regard, the image data may include at least one object (for example, a smoke object) corresponding to the smoking event. For example, the processor 110 may output image data after a time point at which a pressure drop in the smokeless inhalation instrument 200 ends, and the image data may include a smoke object corresponding to a user's exhalation. In this regard, the time point at which the pressure drop ends may refer to a time point at which a user's substantial inhalation from smokeless tobacco ends in a time period of one puff from the smokeless tobacco. Therefore, although a user who smokes through the smokeless inhalation instrument 200 does not substantially exhale tobacco smoke, the user's smoking satisfaction may be increased because image data including a smoke object is visually provided.

Figure 3:
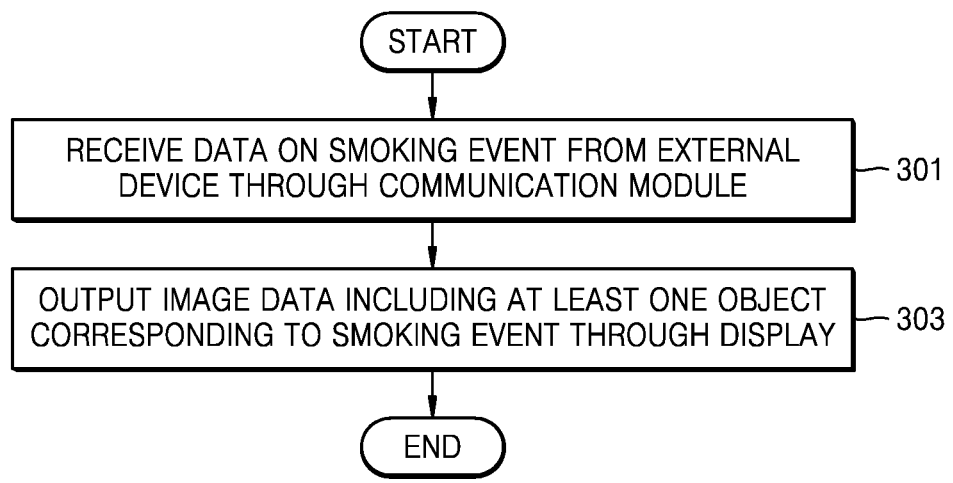
FIG. 3 is a flowchart of an electronic device outputting image data, according to an embodiment.
Figure 4:
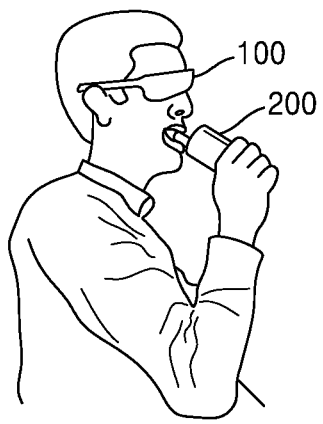
FIG. 4 illustrates a first state of a display of an electronic device, according to an embodiment.
Figure 4:
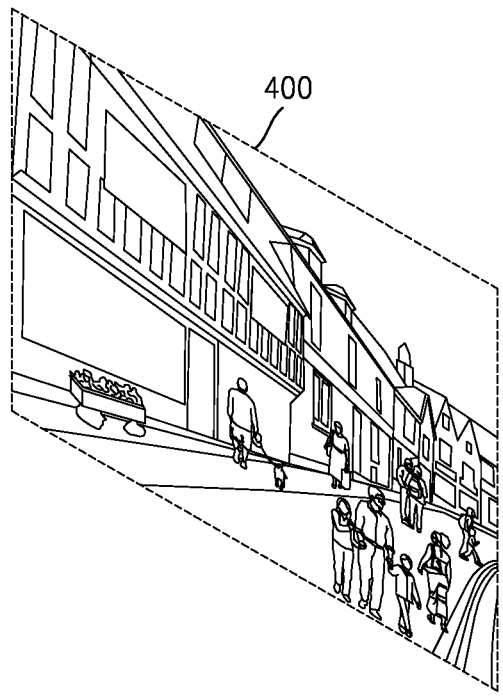
Figure 5:
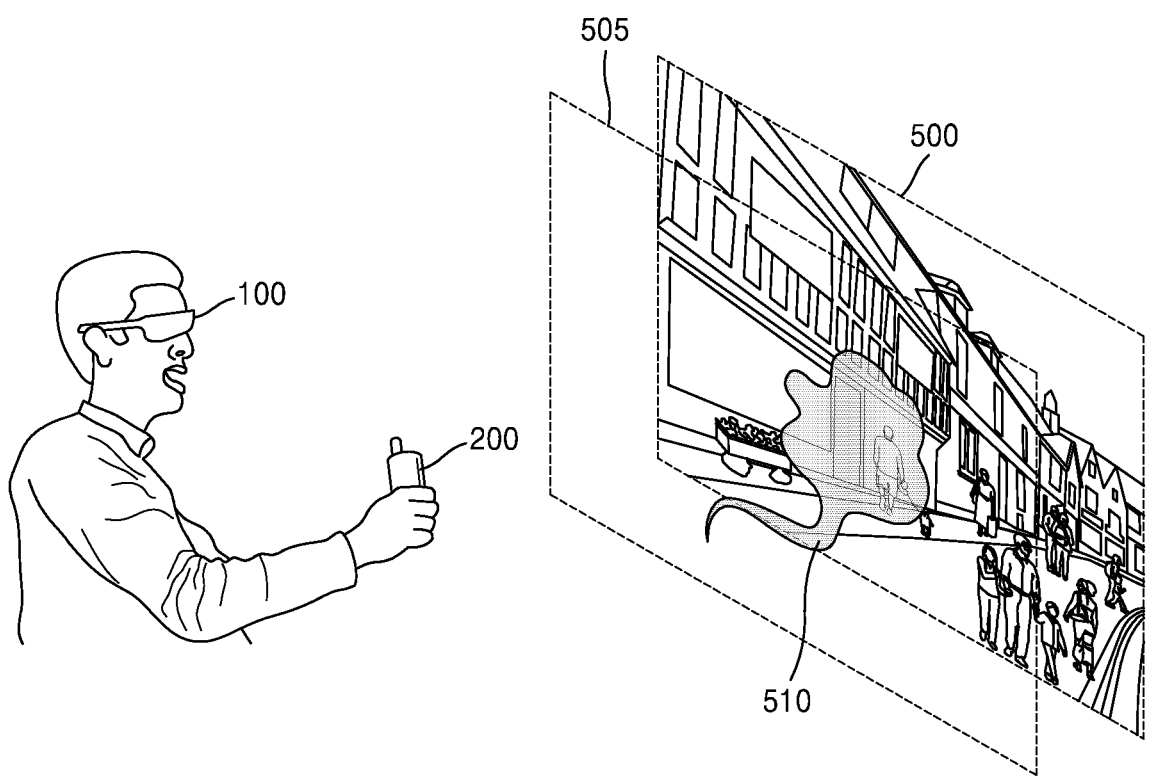
FIG. 5 illustrates a second state of a display of an electronic device, according to an embodiment.

FIG. 3 is a flowchart of an electronic device outputting image data, according to an embodiment. FIG. 4 illustrates a first state of a display of an electronic device, according to an embodiment. FIG. 5 illustrates a second state of a display of an electronic device, according to an embodiment.

Referring to FIG. 3, a processor (for example, the processor 110 in FIG. 2) of an electronic device (for example, the electronic device 100 in FIG. 2) may receive data on a smoking event from an external apparatus (for example, the smokeless inhalation instrument 200 in FIG. 2) through a communication module (for example, the communication module 130 in FIG. 2) in operation 301.

For example, referring to FIG. 4, in response to a user wearing the electronic device 100 on a portion (for example, a head) of a body, the user may see an actual surrounding environment 400 through a display (for example, the display 120 in FIG. 2). In this regard, the display 120 may correspond to a transparent lens in a state in which separate image data is not output. Therefore, the actual surrounding environment 400 that the user may see through the display 120 may refer to a surrounding environment in an actual space in which the user smokes through the smokeless inhalation instrument 200.

Afterwards, when the user inhales from smokeless tobacco through the smokeless inhalation instrument 200 while wearing the electronic device 100, the processor 110 of the electronic device 100 may receive data on a smoking event from the smokeless inhalation instrument 200. For example, a processor (for example, the processor 220 in FIG. 2) of the smokeless inhalation instrument 200 may detect a pressure change through a pressure sensor (for example, the pressure sensor 210 in FIG. 2), and may determine an initial time point at which the pressure change has been detected by the pressure sensor 210 as a time point $t_1$ at which the user starts inhaling from the smokeless tobacco. The processor 220 of the smokeless inhalation instrument 200 may transmit the data on the occurrence of the smoking event corresponding to the pressure change at the time point $t_1$.

In an embodiment, the processor 110 of the electronic device 100 may output image data including at least one object corresponding to the smoking event through a display (for example, the display 120 in FIG. 2) in operation 303.

For example, referring to FIG. 5, in response to a user exhaling after ending one inhalation from smokeless tobacco, the user may see a screen in which image data 505 overlaps an actual surrounding environment 500 through the display 120. In this regard, the electronic device 100 may output the image data 505 to the display 120 through a separate beam arranged on a mounting portion (for example, the mounting portion 103 in FIG. 1). The image data 505 may include a two-dimensional and/or three-dimensional object 510 for tobacco smoke that may be generated during smoking through cigarettes (smoke-producing cigarettes) of the related art.

In an embodiment, when a user ends one inhalation from smokeless tobacco, the processor 110 of the electronic device 100 may receive data on the ending of a smoking event from the smokeless inhalation instrument 200. For example, the processor 220 of the smokeless inhalation instrument 200 may determine a time point at which a pressure change (for example, a pressure drop) is no longer detected by the pressure sensor 210, as a time point $t_2$ at which a user ends one inhalation from smokeless tobacco. The processor 220 of the smokeless inhalation instrument 200 may transmit, to the electronic device 100, data on the ending of the pressure change at the time point $t_2$.

In an embodiment, the processor 110 of the electronic device 100 may determine the image data 505 to be output based on a difference between the time point $t_1$ and the time point $t_2$. In another embodiment, the processor 110 of the electronic device 100 may also determine the image data 505 to be output based on a pressure change degree from the time point $t_1$ to the time point $t_2$. Details will be described with reference to FIG. 6.

Figure 6:
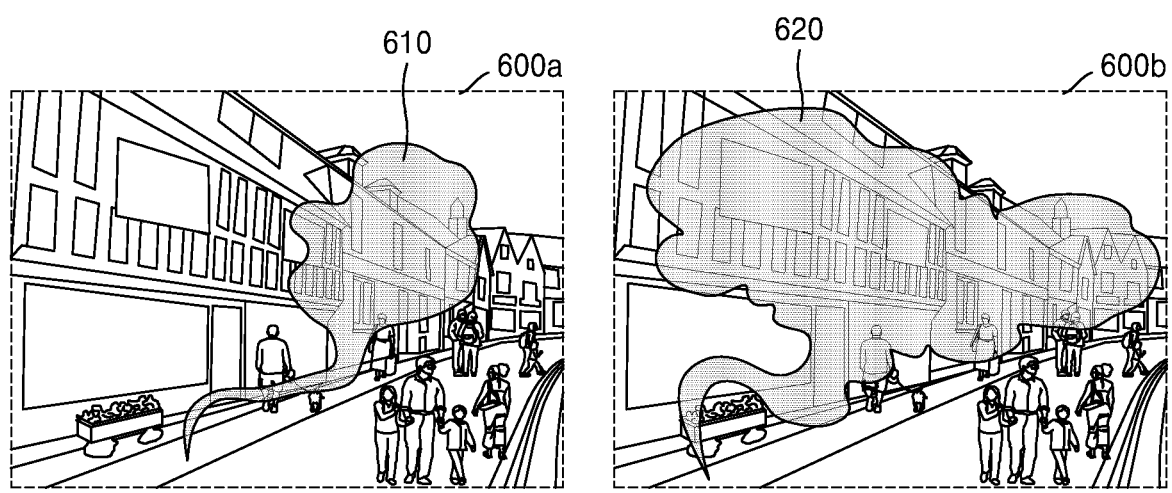
FIG. 6 illustrates a state of a display of an electronic device, which corresponds to inhalation from a smokeless inhalation instrument, according to an embodiment.

FIG. 6 illustrates a state of a display of an electronic device, which corresponds to inhalation from a smokeless inhalation instrument, according to an embodiment.

Referring to FIG. 6, a processor (for example, the processor 110 in FIG. 2) of an electronic device (for example, the electronic device 100 in FIG. 2) may output image data 610 and 620 corresponding to a smoking event through a display (for example, the display 120 in FIG. 2). In an embodiment, the image data 610 and 620 output to the display 120 may be set based on a degree (e.g., intensity) of a user's inhalation. For example, data on a smoking event received by the electronic device 100 from a smokeless inhalation instrument (for example, the smokeless inhalation instrument 200 in FIG. 2) which is an external device may include data on a degree of a user's inhalation, and the processor 110 of the electronic device 100 may output image data corresponding to the degree of the user's inhalation through the display 120.

In an embodiment, the electronic device 100 may receive data on a pressure change as data on a degree of a user's inhalation from the smokeless inhalation instrument 200, and may output image data corresponding to the received data on the pressure change through the display 120.

For example, the data on the degree of the inhalation received by the electronic device 100 from the smokeless inhalation instrument 200 may include a first inhalation pressure (a negative value). In other words, in response to a user inhaling through a mouthpiece portion of the smokeless inhalation instrument 200, a pressure sensor (for example, the pressure sensor 210 in FIG. 2) arranged in an airflow passage of the smokeless inhalation instrument 200 may detect a pressure drop within the passage. In this regard, the first inhalation pressure may be a pressure change value that is detected when the user substantially softly inhales through the mouthpiece portion of the smokeless inhalation instrument 200.

The electronic device 100 may determine image data corresponding to the first inhalation pressure. For example, the electronic device 100 may determine image data corresponding to the first pressure change, based on data that is pre-stored in a memory (not shown). In this regard, the memory may pre-store image data corresponding to a pressure value of the pressure sensor 210. Afterwards, the electronic device 100 may output the image data 610 corresponding to the determined first inhalation pressure through the display 120. For example, the user may see a screen in which the image data 610 corresponding to the determined first inhalation pressure overlaps an actual surrounding environment 600a through the display 120.

As another example, data on a degree of inhalation received by the electronic device 100 from the smokeless inhalation instrument 200 may include a second inhalation pressure (a negative value). In other words, in response to a user inhaling through a mouthpiece portion of the smokeless inhalation instrument 200, the pressure sensor 210 arranged in an airflow passage of the smokeless inhalation instrument 200 may detect a pressure drop within the passage. In this regard, the second inhalation pressure may be a pressure change value that is detected when the user substantially strongly inhales through the mouthpiece portion of the smokeless inhalation instrument 200. Also, an absolute value of the second inhalation pressure may be greater than an absolute value of the first inhalation pressure.

The electronic device 100 may determine image data corresponding to the second inhalation pressure. For example, the electronic device 100 may determine image data corresponding to the second inhalation pressure, based on data that is pre-stored in a memory (not shown). Afterwards, the electronic device 100 may output the image data 620 corresponding to the determined second inhalation pressure through the display 120. For example, the user may see a screen in which the image data 620 corresponding to the determined second inhalation pressure overlaps an actual surrounding environment 600b through the display 120.

The image data 610 corresponding to the first inhalation pressure and the image data 620 corresponding to the second inhalation pressure may include different forms of objects from each other. For example, the image data 610 corresponding to the first inhalation pressure and the image data 620 corresponding to the second inhalation pressure may visualize tobacco smoke generated by smoking, but the forms of the tobacco smoke (for example, amounts of the tobacco smoke and/or shapes of the tobacco smoke) may be different from each other. In other words, the image data 620 when the user substantially strongly inhales through the mouthpiece portion of the smokeless inhalation instrument 200 may include a larger and richer form of tobacco smoke than that in the image data 610 when the user substantially softly inhales through the mouthpiece portion of the smokeless inhalation instrument 200.

In another embodiment, the electronic device 100 may also receive data on an inhalation time as data on a degree of a user's inhalation from the smokeless inhalation instrument 200, and may output image data corresponding to the received data on the inhalation time through the display 120.

For example, the data on the degree of the inhalation received by the electronic device 100 from the smokeless inhalation instrument 200 may include a first inhalation time (for example, 1 second). In other words, in response to a user inhaling through a mouthpiece portion of the smokeless inhalation instrument 200, the smokeless inhalation instrument 200 may detect initiation of the user's inhalation through a sensor included in the smokeless inhalation instrument 200 (for example, the pressure sensor 210 and a capacitance sensor (not shown)). Then, the smokeless inhalation instrument 200 may determine the first inhalation time by measuring a duration (e.g., 1 second) of the inhalation through a timer (not shown) included in the smokeless inhalation instrument 200. In this regard, the first inhalation time may be an inhalation time that is detected when the user substantially briefly inhales through the mouthpiece portion of the smokeless inhalation instrument 200.

The electronic device 100 may determine image data corresponding to the first inhalation time. For example, the electronic device 100 may determine image data corresponding to the first inhalation time, based on data pre-stored in a memory. In this regard, the memory may pre-store image data corresponding to an inhalation time in the smokeless inhalation instrument 200. Then, the electronic device 100 may output the image data 610 corresponding to the determined first inhalation time through the display 120. For example, the user may see a screen in which the image data 610 corresponding to the determined first inhalation time overlaps the actual surrounding environment 600a through the display 120.

As another example, the data on the degree of the inhalation received by the electronic device 100 from the smokeless inhalation instrument 200 may include a second inhalation time (for example, 2 seconds). In other words, in response to a user inhaling through a mouthpiece portion of the smokeless inhalation instrument 200, the smokeless inhalation instrument 200 may detect initiation of the user's inhalation through a sensor included in the smokeless inhalation instrument 200 (for example, the pressure sensor 210 and a capacitance sensor). Then, the smokeless inhalation instrument 200 may determine a second inhalation time by measuring a duration (e.g., 2 seconds) of the inhalation through a timer (not shown) included in the smokeless inhalation instrument 200. In this regard, the second inhalation time may be an inhalation time that is detected when the user substantially inhales through the mouthpiece portion of the smokeless inhalation instrument 200 for long.

The electronic device 100 may determine image data corresponding to the second inhalation time. For example, the electronic device 100 may determine image data corresponding to the second inhalation time, based on data pre-stored in a memory. Afterwards, the electronic device 100 may output the image data 620 corresponding to the determined second inhalation time through the display 120. For example, the user may see a screen in which the image data 620 corresponding to the determined second inhalation time overlaps the actual surrounding environment 600b through the display 120.

The image data 610 corresponding to the first inhalation time and the image data 620 corresponding to the second inhalation time may include different forms of objects from each other. For example, the image data 610 corresponding to the first inhalation time and the image data 620 corresponding to the second inhalation time may include forms of tobacco smoke generated by smoking, but the forms of the tobacco smoke (for example, amounts of the tobacco smoke and/or shapes of the tobacco smoke) may be different from each other. In other words, the image data 620 when the user substantially inhales through the mouthpiece portion of the smokeless inhalation instrument 200 for long may include a form of larger and richer tobacco smoke than that in the image data 610 when the user substantially briefly inhales through the mouthpiece portion of the smokeless inhalation instrument 200.

Figure 7:
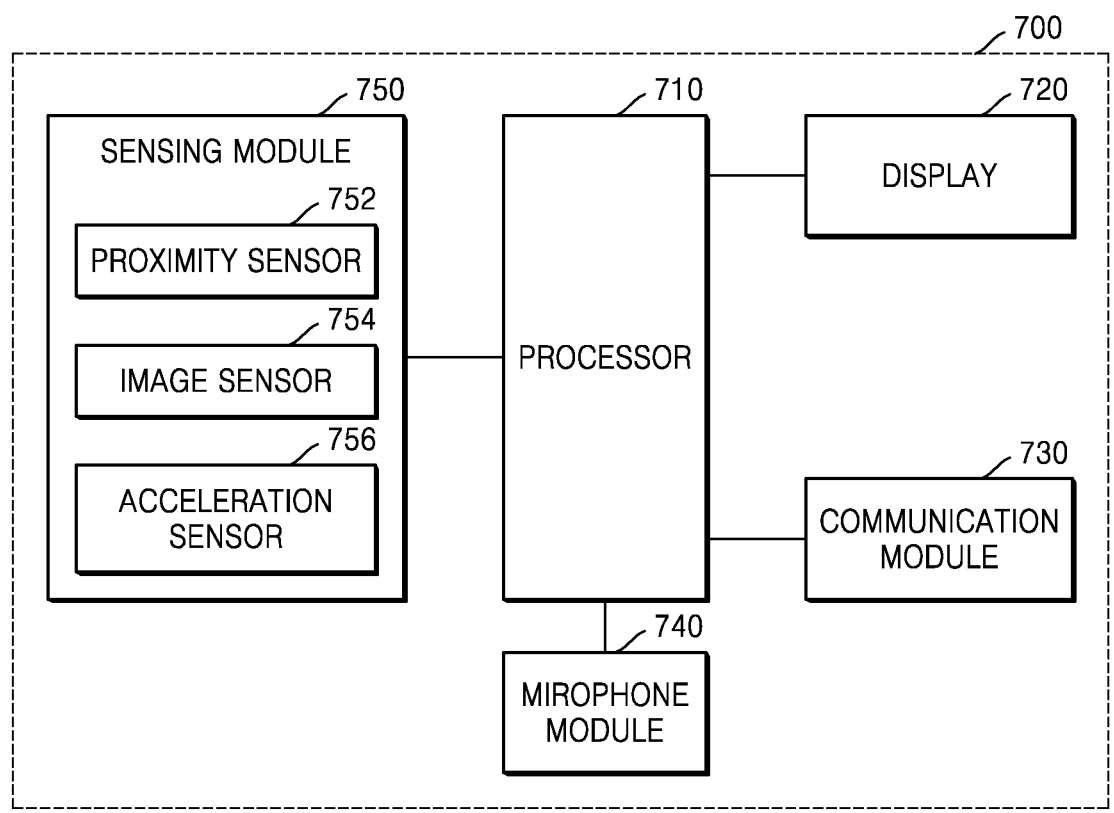
FIG. 7 is a block diagram of an electronic device according to another embodiment.

FIG. 7 is a block diagram of an electronic device according to another embodiment.

Referring to FIG. 7, an electronic device 700 may include a processor 710, a display 720, a communication module 730, a microphone module 740, and a sensing module 750. The electronic device 700 in FIG. 7 may correspond to the electronic device 100 in FIG. 1, and thus, details on the processor 710, the display 720, and the communication module 730 in FIG. 7 may respectively correspond to the details on the processor 110, the display 120, and the communication module 130 in FIG. 1.

In an embodiment, the microphone module 740 may obtain audio data from the outside. For example, the microphone module 740 may obtain external audio data and convert the obtained audio data into an electrical signal. In an embodiment, the processor 710 may convert an inactivation state of the microphone module 740 into an activation state when a preset condition is satisfied. For example, the preset condition may include receiving, by the electronic device 700, of data on a smoking event from a smokeless inhalation instrument (for example, the smokeless inhalation instrument 200 in FIG. 2). In other words, when the electronic device 700 receives data on a smoking event (for example, data on a pressure change and data on a user's inhalation time) from the smokeless inhalation instrument 200, the processor 710 may convert an inactivation state of the microphone module 740 into an activation state.

In an embodiment, the sensing module 750 may include at least one sensor to detect an operating state of the electronic device 700 or an external environment state and generate an electrical signal or a data value, each corresponding to the detected state. For example, the sensing module 750 may include a proximity sensor 752, an image sensor 754, and an acceleration sensor 756.

In an embodiment, the processor 710 may detect whether an external device (for example, the smokeless inhalation instrument 200) is in proximity through the proximity sensor 752. The processor 710 may output image data corresponding to a smoking event through the display 720, based on data on the smoking event, which is received from the smokeless inhalation instrument 200 through the communication module 730, and whether the smokeless inhalation instrument 200 is in proximity.

In an embodiment, the processor 710 may detect whether a shape of an oral region of a user has changed through the image sensor 754. In other words, the image sensor 754 may be arranged in a region in a lower region of a face plate (for example, the face plate 101 in FIG. 1) of the electronic device 700 to obtain the shape of the oral region of the user wearing the electronic device 700. The processor 710 may output image data corresponding to a smoking event through the display 720, based on data on the smoking event, which is received from the smokeless inhalation instrument 200 through the communication module 730, and whether the shape of the oral region of the user has changed.

In an embodiment, the processor 710 may detect a movement of the electronic device 700 through the acceleration sensor 756. The processor 710 may output image data corresponding to a smoking event through the display 720, based on data on the smoking event, which is received from the smokeless inhalation instrument 200 through the communication module 730, and the movement of the electronic device 700.

Figure 8:
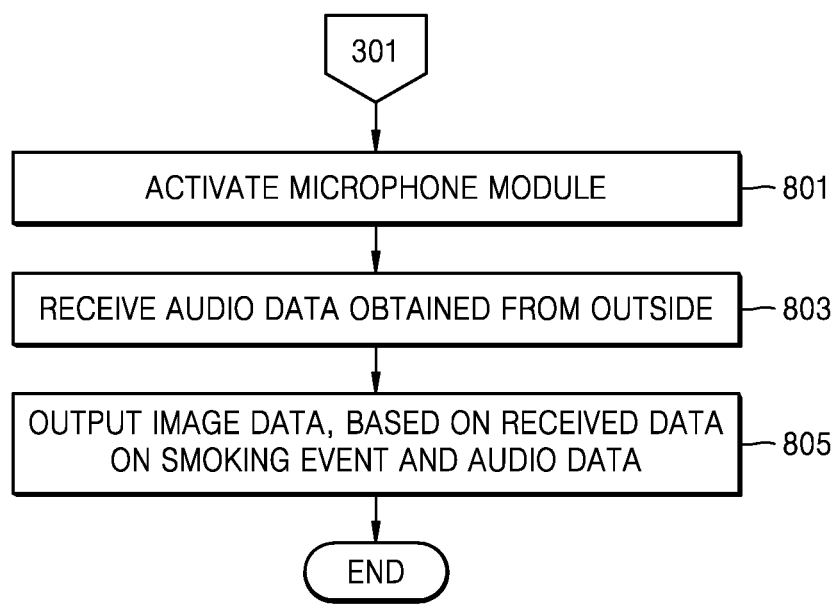
FIG. 8 is a flowchart of an electronic device outputting image data, according to another embodiment.

FIG. 8 is a flowchart of an electronic device outputting image data, according to another embodiment. FIG. 8 illustrates an example of an operation after operation 301 in FIG. 3.

Referring to FIG. 8, a processor (for example, the processor 710 in FIG. 7) of an electronic device (for example, the electronic device 700 in FIG. 7) may convert an inactivation state of a microphone module (for example, the microphone module 740 in FIG. 7) into an activation state in operation 801. For example, the processor 710 may convert an inactivation state of the microphone module 740 into an activation state when a preset condition is satisfied. In this regard, the preset condition may include at least one of whether data on a smoking event is received from a smokeless inhalation instrument (for example, the smokeless inhalation instrument 200 in FIG. 2), whether communication connection with the smokeless inhalation instrument 200 is performed, and whether there is a user input for activating the microphone module 740.

In an embodiment, the processor 710 of the electronic device 700 may receive audio data obtained from the outside through the microphone module 740 in operation 803. For example, the audio data may include a voice signal corresponding to an inhalation in which a user inhales through a mouthpiece portion of the smokeless inhalation instrument 200 and/or a voice signal corresponding to an exhalation immediately after the inhalation.

In an embodiment, the microphone module 740 may further include a separate voice processing module (for example, an analog-to-digital converter (ADC)) that converts a voice signal, which is an analog signal, obtained from the outside into a digital signal. For example, the voice processing module of the microphone module 740 may convert a voice signal corresponding to a user's inhalation and/or exhalation, which is obtained from the outside, into a digital signal, and the processor 710 of the electronic device 700 may store the converted digital signal in a memory. In this regard, the voice processing module may convert the voice signal corresponding to the user's inhalation and/or exhalation, which is obtained from the outside, into the digital signal through a series of operations such as sampling, quantization, and encoding. Afterwards, when the audio data is received through the microphone module 740, the processor 710 of the electronic device 700 may determine, based on the digital signal stored in the memory, whether the received audio data includes the voice signal corresponding to the user's inhalation and/or includes the voice signal corresponding to the exhalation.

In an embodiment, the processor 710 of the electronic device 700 may output image data, based on the received data on the smoking event and the received audio data, in operation 805.

The "received data on the smoking event" in the disclosure may refer to data on a pressure change, which is received from the smokeless inhalation instrument 200 in response to a user inhaling from smokeless tobacco through the smokeless inhalation instrument 200. Also, the "received audio data" in the disclosure may refer to audio data including a voice signal corresponding to an inhalation of a user who inhales from smokeless tobacco and/or a voice signal corresponding to an exhalation.

For example, when data on a pressure change that is greater than a preset threshold value is received from the smokeless inhalation instrument 200 and audio data including a voice signal corresponding to a user's inhalation is received from the microphone module 740, the processor 710 of the electronic device 700 may output image data through a display (for example, the display 720 in FIG. 7). In this regard, the image data nay be determined based on a value of the pressure change received from the smokeless inhalation instrument 200 and the voice signal received from the microphone module 740.

As another example, when data on a pressure change that is greater than a preset threshold value is received from the smokeless inhalation instrument 200, the processor 710 of the electronic device 700 may determine image data to be output through the display 720. Afterwards, when audio data including a voice signal corresponding to a user's exhalation is received from the microphone module 740, the processor 710 of the electronic device 700 may output the determined image data through the display 720 from a time point at which the audio data is received.

Figure 9:
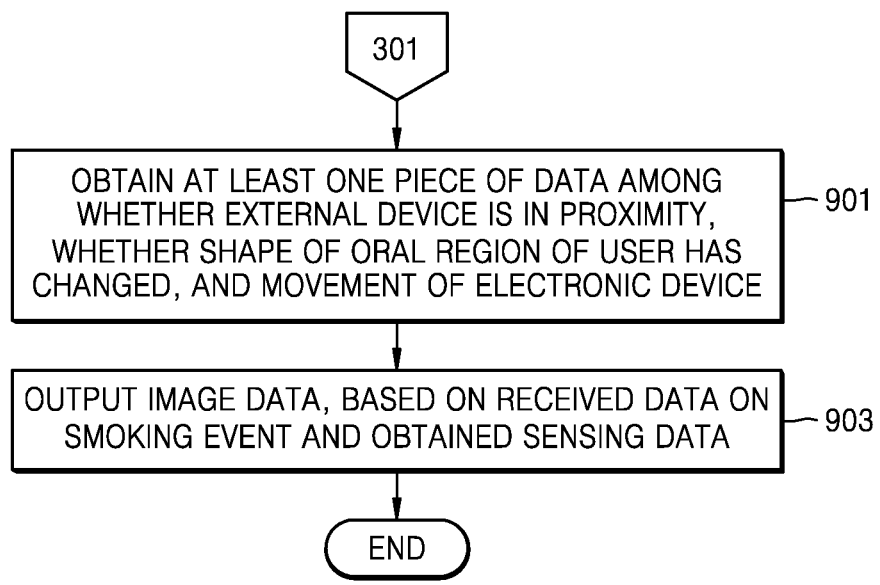
FIG. 9 is a flowchart of an electronic device outputting image data, according to another embodiment.

FIG. 9 is a flowchart of an electronic device outputting image data, according to another embodiment. FIG. 9 illustrates an example of an operation after operation 301 in FIG. 3.

Referring to FIG. 9, a processor (for example, the processor 710 in FIG. 7) of an electronic device (for example, the electronic device 700 in FIG. 7) may obtain at least one piece of data among whether an external device is in proximity, whether a shape of an oral region of a user has changed, and a movement of the electronic device 700 through a sensing module (for example, the sensing module 750 in FIG. 7) in operation 901.

For example, the processor 710 of the electronic device 700 may obtain data on whether an external device (for example, the smokeless inhalation instrument 200 in FIG. 2) is in proximity to the electronic device 700 through a proximity sensor (for example, the proximity sensor 752 in FIG. 71). In other words, when a user is wearing the electronic device 700, the processor 710 of the electronic device 700 may determine that a smoking operation is performed by the user, based on the proximity of the smokeless inhalation instrument 200, which is the external device, to the electronic device 700.

As another example, the processor 710 of the electronic device 700 may obtain data on whether a shape of an oral region of a user has changed through an image sensor (for example, the image sensor 754 in FIG. 7). In other words, when the user is wearing the electronic device 700, the processor 710 of the electronic device 700 may determine that a smoking operation is performed by the user, based on a change in the shape of the oral region of the user into a specific shape (for example, a shape of the oral region when the user makes an "o" sound).

As another example, the processor 710 of the electronic device 700 may obtain data on whether the electronic device 700 is moving, through an acceleration sensor (for example, the acceleration sensor 756 in FIG. 7). In other words, when a user is wearing the electronic device 700, the processor 710 of the electronic device 700 may determine that a smoking operation is performed by the user, if the user wearing the electronic device 700 moves to perform smoking.

In an embodiment, the processor 710 of the electronic device 700 may output image data, based on the received data on the smoking event and the obtained sensing data, in operation 903.

For example, when data on a pressure change that is greater than a preset threshold value is received from the smokeless inhalation instrument 200 and at least one sensing data among whether the smokeless inhalation instrument 200 is in proximity, whether a shape of an oral region of a user has changed, and a movement of the electronic device 700 is received from the sensing module 750, the processor 710 of the electronic device 700 may output image data through a display (for example, the display 720 in FIG. 7). In this regard, the image data may be determined based on a value of the pressure change received from the smokeless inhalation instrument 200 and the sensing data received from the sensing module 750.

Figure 10A:
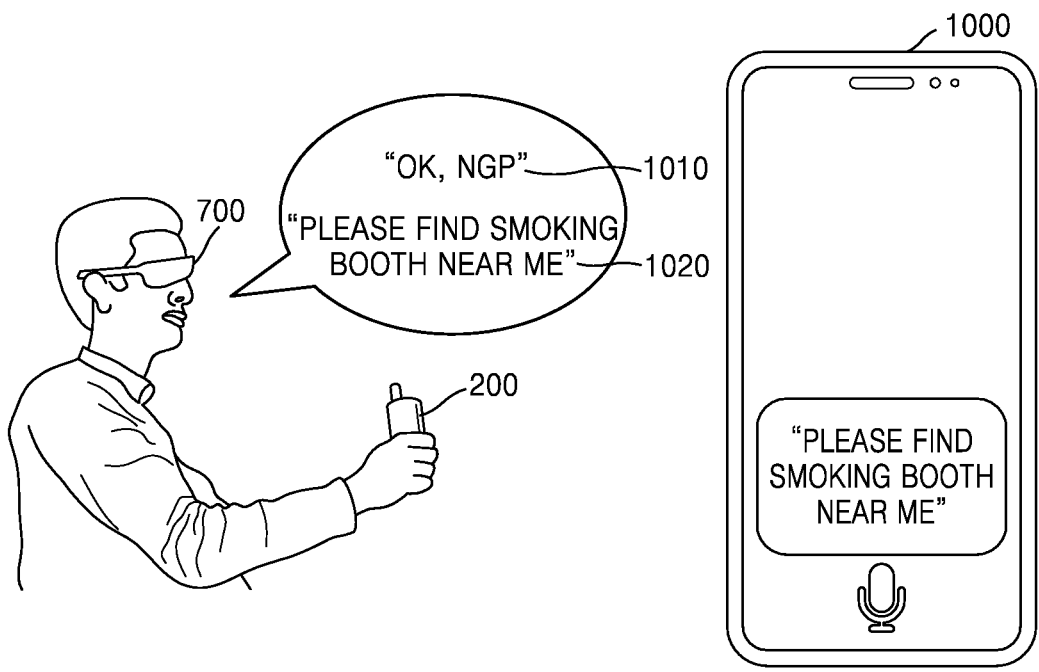
FIG. 10A is an example diagram of an electronic device searching for a location based on voice recognition, according to an embodiment.
Figure 10B:
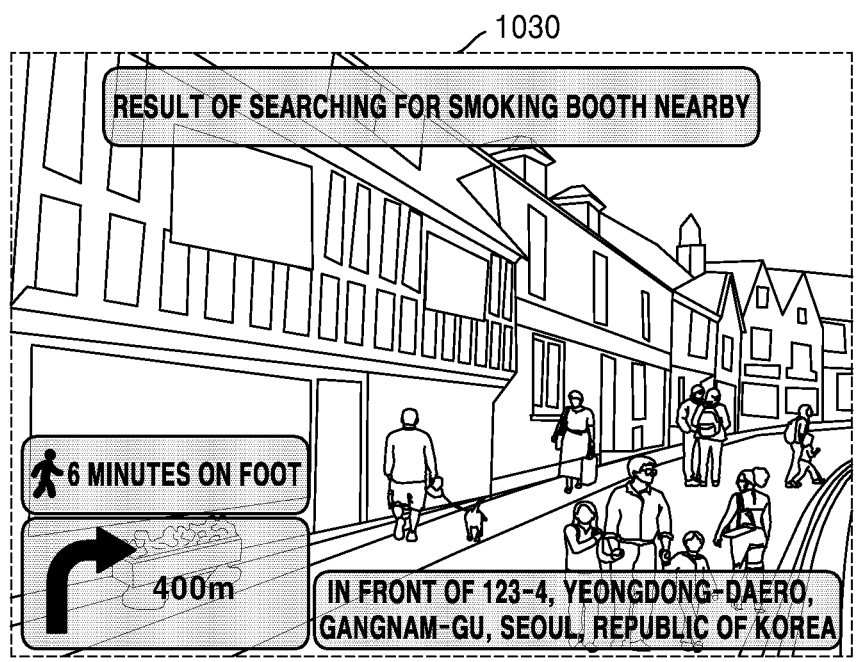
FIG. 10B is an example diagram of a display on which the electronic device in FIG. 10A displays a location search result.

FIG. 10A is an example diagram of an electronic device searching for a location based on voice recognition, according to an embodiment. FIG. 10B is an example diagram of a display on which the electronic device in FIG. 10A displays a location search result.

Referring to FIG. 10A, communication may be connected between the electronic device 700, the smokeless inhalation instrument 200, and a user terminal device 1000 through a communication interface. For example, a communication module (for example, the communication module 730 in FIG. 7) of the electronic device 700 may be connected to a network through wireless communication or wired communication to communicate with the smokeless inhalation instrument 200 and/or the user terminal device 1000.

In an embodiment, the electronic device 700 may perform voice recognition through a microphone module (for example, the microphone module 740 in FIG. 7). For example, a processor (for example, the processor 710 in FIG. 7) of the electronic device 700 may preset a specific phrase (for example, "OK, NGP") as a wake-up instruction 1010 for activating a separate voice recognition processor. If the user's speech input through the microphone module 740 matches the preset phrase, the processor 710 may activate the voice recognition processor.

In an embodiment, the processor 710 of the electronic device 700 may preset a specific words (for example, "near", "nearby", "where", "please find", and "please let me know") as an instruction for requesting map data from the user terminal device 1000. If the user's speech "please find a smoking booth near me" 1020 is input through the microphone module 740, the processor 710 of the electronic device 700 may determine whether the input speech includes the preset instruction. When determining that the input speech includes the preset instruction, the processor 710 of the electronic device 700 may request map data from the user terminal device 1000 through the communication module 730.

Referring to FIG. 10B, the processor 710 of the electronic device 700 may output image data including a location search result through a display (for example, the display 720 in FIG. 7). For example, a user may see a screen 1030 in which the map data received from the user terminal device 1000 overlaps an actual surrounding environment through the display 720. In this regard, the map data received from the user terminal device 1000 may refer to data shared from the user terminal device 1000 through a mirroring technique. For example, the map data received from the user terminal device 1000 may be shared map data obtained through an application (for example, a navigation application) of the user terminal device 1000.

Figure 11A:
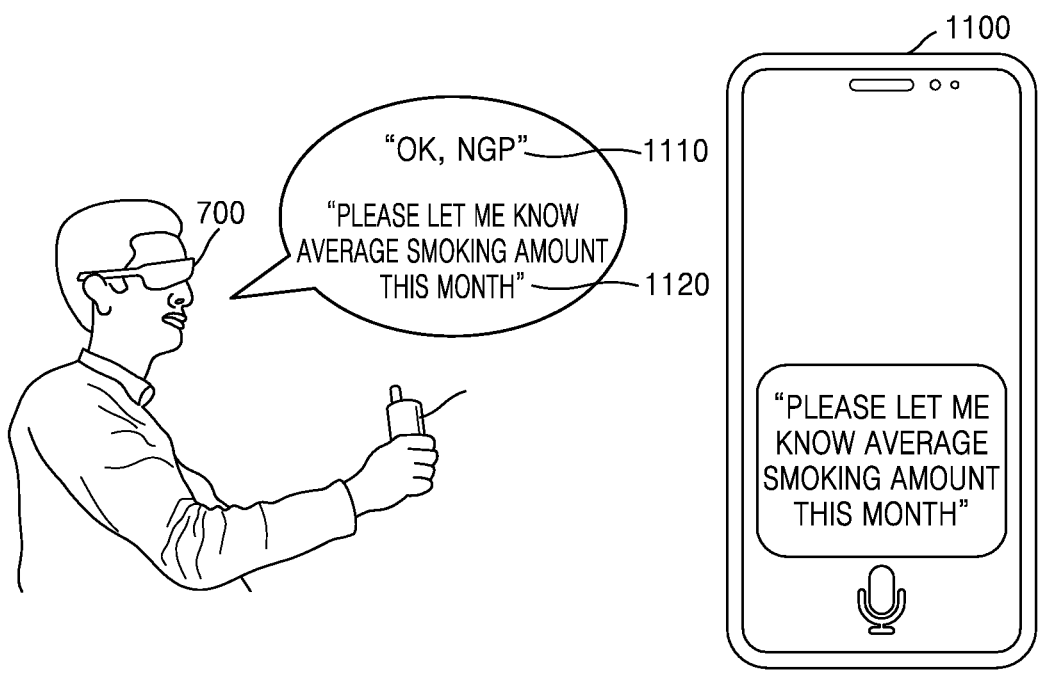
FIG. 11A is an example diagram in which an electronic device searches for an average smoking amount based on voice recognition, according to an embodiment.
Figure 11B:
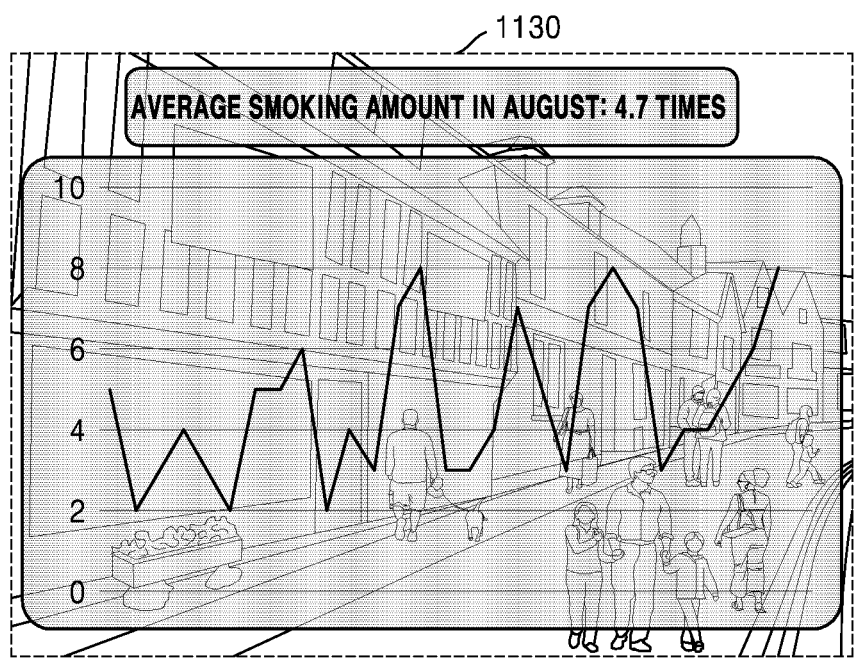
FIG. 11B is an example diagram of a display on which the electronic device in FIG. 11A displays the average smoking amount.

FIG. 11A is an example diagram in which an electronic device searches for an average smoking amount based on voice recognition, according to an embodiment. FIG. 11B is an example diagram of a display on which the electronic device in FIG. 11A displays the average smoking amount.

Referring to FIG. 11A, communication may be connected between the electronic device 700, the smokeless inhalation instrument 200, and a user terminal device 1100 through a communication interface. For example, a communication module (for example, the communication module 730 in FIG. 7) of the electronic device 700 may be connected to a network through wireless communication or wired communication to communicate with the smokeless inhalation instrument 200 and/or the user terminal device 1100.

In an embodiment, the electronic device 700 may perform voice recognition through a microphone module (for example, the microphone module 740 in FIG. 7). For example, a processor (for example, the processor 710 in FIG. 7) of the electronic device 700 may preset a specific phrase (for example, "OK, NGP") as a wake-up instruction 1110 for activating a separate voice recognition processor. If the user's speech input through the microphone module 740 matches the preset phrase, the processor 710 may activate the voice recognition processor.

In an embodiment, the processor 710 of the electronic device 700 may preset a specific words (for example, "this month", "today", "average", "smoking amount", and "please let me know") as an instruction for requesting at least one of average smoking amount data and current smoking amount data from the user terminal device 1100. If the user's speech "please let me know an average smoking amount this month." 1120 is input through the microphone module 740, the processor 710 of the electronic device 700 may determine whether the input voice includes the preset instruction. When determining that the input voice includes the preset instruction, the processor 710 of the electronic device 700 may request at least one of average smoking amount data and current smoking amount data from the user terminal device 1100 through the communication module 730.

Referring to FIG. 11B, the processor 710 of the electronic device 700 may output image data including average smoking amount data through a display (for example, the display 720 in FIG. 7). For example, a user may see a screen 1130 in which the average smoking amount data received from the user terminal device 1100 overlaps an actual surrounding environment through the display 720. In this regard, the average smoking amount data received from the user terminal device 1100 may refer to data shared from the user terminal device 1100 through the mirroring technique. For example, the average smoking amount data received from the user terminal device 1100 may be shared smoking amount data obtained through an application (for example, a smoking habit application) of the user terminal device 1100.

One embodiment may also be implemented in the form of a computer-readable recording medium including instructions executable by a computer, such as a program module executable by the computer. The computer-readable recording medium may be any available medium that can be accessed by a computer, including both volatile and non-volatile media, and both removable and non-removable media. In addition, The computer-readable recording medium may include both a computer storage medium and a communication medium. The computer storage medium includes all of volatile and nonvolatile media, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by those of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An electronic device wearable by a user, the electronic device comprising:
 a communication module configured to perform communication with an external device;
 a display; and
 a processor electrically connected to the communication module and the display, and configured to:
  when a power of the external device is turned on, establish the communication with the external device;
  when data on a smoking event from the external device through the communication module is received within a threshold time after the communication is established, output image data including at least one object corresponding to the smoking event, through the display, based on the received data on the smoking event; and
  when the data on a smoking event from the external device is not received within the threshold time after the communication is established, release the communication with the external device.

2. The electronic device of claim 1, wherein the data on the smoking event comprises data on a pressure change detected by a pressure sensor of the external device.

3. The electronic device of claim 2, wherein the processor is further configured to:
 when first data on a first pressure change is received from the external device, output first image data based on the first data, and
 when second data on a second pressure change greater than the first pressure change is received from the external device, output second image data different from the first image data based on the second data.

4. The electronic device of claim 3, wherein the first image data and the second image data are different from each other in at least one of an amount of tobacco smoke and a shape of tobacco smoke.

5. The electronic device of claim 1, further comprising a microphone module
 configured to obtain external audio data,
 wherein the processor is further configured to:
 when the data on the smoking event is received from the external device, activate the microphone module,
 receive audio data obtained from outside through the activated microphone module, and
 output the image data including the at least one object corresponding to the smoking event, based on the received data on the smoking event and the received audio data.

6. The electronic device of claim 1, further comprising a sensing module comprising at least one sensor,
 wherein the processor is further configured to:
 obtain, through the sensing module, sensing data about at least one of whether the external device is in proximity, whether a shape of an oral region of the user is changed, and a movement of the electronic device, and output the image data including the at least one object corresponding to the smoking event, based on the received data on the smoking event and the obtained sensing data.

7. The electronic device of claim 1, further comprising a microphone module configured to obtain external audio data,
wherein the processor is further configured to:
receive audio data obtained from outside through the microphone module,
when the received audio data corresponds to preset data, request map data from a user terminal device through the communication module, and
when the map data is received from the user terminal device, output the received map data through the display.

8. The electronic device of claim 1, further comprising a microphone module configured to obtain external audio data,
wherein the processor is further configured to:
receive audio data obtained from outside through the microphone module,
when the received audio data corresponds to preset data, request at least one of average smoking amount data and current smoking amount data from a user terminal device through the communication module, and
when the at least one of the average smoking amount data and the current smoking amount data is received from the user terminal device, output the received data through the display.

9. An operating method of an electronic device wearable by a user, the operating method comprising:
establishing a communication with an external device through a communication module,
when a power of the external device is turned on;
outputting image data including at least one object corresponding to a smoking event, through a display, based on the received data on the smoking event, when data on the smoking event from the external device is received within a threshold time after the communication is established; and
releasing the communication with the external device, when the data on a smoking event from the external device is not received within the threshold time after the communication is established.

10. The operating method of claim 9, wherein the data on the smoking event comprises data on a pressure change detected by a pressure sensor of the external device.

11. The operating method of claim 10, further comprising:
when first data on a first pressure change is received from the external device, outputting first image data based on the first data; and
when second data on a second pressure change that is greater than the first pressure change is received from the external device, outputting second image data different from the first image data, based on the second data.

12. The operating method of claim 9, further comprising:
when the data on the smoking event is received from the external device, activating a microphone module;
receiving audio data obtained from outside through the activated microphone module; and
based on the received data on the smoking event and the received audio data, outputting the image data including the at least one object corresponding to the smoking event.

13. The operating method of claim 9, further comprising:
obtaining, through a sensing module, sensing data about at least one of whether the external device is in proximity, whether a shape of an oral region of the user has changed, and a movement of the electronic device; and
based on the received data on the smoking event and the obtained sensing data, outputting the image data including the at least one object corresponding to the smoking event.

14. The operating method of claim 9, further comprising:
receiving audio data obtained from outside through a microphone module;
when the received audio data corresponds to preset data, requesting map data from a user terminal device through the communication module; and
when the map data is received from the user terminal device, outputting the received map data through the display.

15. The operating method of claim 9, further comprising:
receiving audio data obtained from outside through a microphone module;
when the received audio data corresponds to preset data, requesting at least one of average smoking amount data and current smoking amount data from a user terminal device through the communication module; and
when the at least one of the average smoking amount data and the current smoking amount data is received from the user terminal device, outputting the received data through the display.

* * * * *